(12) United States Patent
Ford et al.

(10) Patent No.: US 7,662,433 B2
(45) Date of Patent: Feb. 16, 2010

(54) ABRASION AND/OR SCRATCH RESISTANT ARTICLE COMPRISING AN IMPACT RESISTANT PHOTOCHROMIC POLYURETHANE COATING, AND PROCESS OF PREPARATION THEREOF

(75) Inventors: Christy Ford, St. Petersburg, FL (US); Pamela McClimans, Flower Mound, TX (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 575 days.

(21) Appl. No.: 11/532,272

(22) Filed: Sep. 15, 2006

(65) Prior Publication Data
US 2008/0067701 A1 Mar. 20, 2008

(51) Int. Cl.
*B05D 5/06* (2006.01)
*C03C 17/34* (2006.01)
*G02B 1/04* (2006.01)

(52) U.S. Cl. .................. 427/163.1; 427/164; 427/493.5
(58) Field of Classification Search ............. 428/423.1; 427/163.1, 164, 493.5
See application file for complete search history.

(56) References Cited

U.S. PATENT DOCUMENTS 6,107,395 A    8/2000  Rosthauser et al. ......... 524/719
6,187,444 B1   2/2001  Bowles, III et al. ...... 428/423.1
6,773,108 B2   8/2004  DeRojas et al. ............. 351/166
6,797,383 B2 * 9/2004  Nishizawa et al. .......... 428/412
2005/0233153 A1 10/2005 Qin et al. ................. 428/423.1

FOREIGN PATENT DOCUMENTS

WO    WO 98/37115    8/1998
WO    WO 02/04535    1/2002

OTHER PUBLICATIONS

PCT International Search Report and Written Opinion, issued in International Application No. PCT/EP2007/059673, dated Feb. 1, 2008.

* cited by examiner

*Primary Examiner*—Thao T. Tran
(74) *Attorney, Agent, or Firm*—Fulbright & Jaworski L.L.P.

(57) ABSTRACT

Processes for obtaining an impact resistant, abrasion and/or scratch resistant photochromic article comprising a substrate having two main faces, comprising: preparing a curable coating composition comprising at least one unblocked polyisocyanate terminated polyurethane pre-polymer, at least one polyol, and at least one photochromic agent; depositing the curable coating composition onto at least part of a main face of the substrate; curing the coating composition for 10 minutes or less, at a temperature lower than or equal to 100° C. to form an impact resistant photochromic coating; forming an abrasion and/or scratch resistant coating on the impact resistant photochromic coating or forming a protective coating on the impact resistant photochromic coating and then forming an abrasion and/or scratch resistant coating on said protective coating. Articles obtainable by such processes, including but not limited to ophthalmic lenses. Curable coating compositions involved in such processes.

31 Claims, 1 Drawing Sheet

ABRASION AND/OR SCRATCH RESISTANT ARTICLE COMPRISING AN IMPACT RESISTANT PHOTOCHROMIC POLYURETHANE COATING, AND PROCESS OF PREPARATION THEREOF

BACKGROUND OF THE INVENTION

1. Field of the Invention

The present invention concerns an abrasion and/or scratch resistant article comprising an impact resistant photochromic polyurethane coating, in particular a photochromic ophthalmic lens, a process of preparation thereof without the need for high curing temperatures and long curing times, an impact resistant photochromic polyurethane film and a curable coating composition for the preparation thereof.

2. Description of Related Art

The phenomenon of photochromism has been known for many years. A compound is described as photochromic when, for example, this compound, irradiated with a light beam containing some wavelengths in the ultraviolet region, changes colour and returns to its original colour when the irradiation ceases.

There are many applications of this phenomenon, but one of the most useful known applications is in the ophthalmic optics field, in the manufacture of lenses or spectacle glasses, so as to filter the light radiation as a function of its intensity.

The incorporation of photochromic compounds into an organic material constituting an ophthalmic lens gives a glass, the weight of which is considerably less than that of conventional lenses composed of inorganic glass containing silver halides as photochromic agents.

A widely used method for manufacturing ophthalmic lenses from photochromic organic materials is the method known as "thermal transfer" (imbibition), in which the organic photochromic compounds, such as spirooxazines or chromenes, are applied to the lens by means of a temporary support such as a varnish, then the coated lens is heated so as to cause the transfer of the photochromic compound of the varnish onto the main face of the lens. This method is especially disclosed in patents U.S. Pat. Nos. 4,286,957 and 4,880,667.

Another technique known as "cast-in-place" consists of incorporating the photochromic organic compounds into a polymerizable mixture leading to a transparent organic material, introducing this into a mould and then initiating its polymerization.

After removal from the mould, a photochromic ophthalmic lens is obtained, the photochromic pigments of which are incorporated into the bulk of this lens.

This latter technique has two major disadvantages: i) it requires considerable quantities of photochromic pigments, which are costly compounds; ii) the initiators used for the polymerization degrade the photochromic pigments, which tends to cause a reduction in their photochromic performance. In addition, the presence of the degradation products, which are generally coloured, can change the appearance of the final lens, rendering it unsuitable for its use.

In addition, in the two above techniques, since the performances of the photochromic pigments are closely dependent on the material in which they are incorporated, it has been necessary to develop specific organic materials suitable for the incorporation of such pigments.

Finally, some organic materials used in ophthalmic optics such as polycarbonates (thermoplastic materials generally transformed by injection moulding) have a polymer matrix which is unsuitable for being imbibed by photochromic compounds.

An advantageous technique which is an alternative to the thermal transfer and cast-in-place techniques involves applying to the surface of a preformed ophthalmic lens a coating composition containing dissolved photochromic compounds capable to form a material that can host photochromic compounds.

The nature of the material constituting the ophthalmic lens onto which the photochromic coating is applied is thus, in principle, no longer relevant. Such a technique is disclosed for example in the patent EP 146136.

The activation and deactivation time of the photochromic compound are dependent on the free volume in the polymer matrix: the more free volume the polymer matrix has, the faster the photochromic compound can darken and fade. The free volume of the polymer matrix being dependent upon the flexibility of the chain segments of the polymer environment surrounding the photochromic compound, soft and flexible polymer matrixes such as polyurethane matrixes are preferred.

Photochromic polyurethane coatings are described in patents or patent applications U.S. Pat. No. 6,187,444 (WO 98/37115), U.S. 2005/0233153 and U.S. Pat. No. 6,773,108.

U.S. Pat. No. 6,187,444 relates to photochromic polyurethane coating compositions comprising, in a suitable solvent, at least one photochromic compound, a polyol, a blocked polyisocyanate monomer and a tin catalyst. Said coating composition is applied by spin coating onto the surface of an ophthalmic lens substrate and then cured. However, this technique cannot be implemented on certain substrates, since the blocked polyisocyanates require to be heated during the curing step to elevated temperatures (90-200° C., typically 140° C.) to react in the same way as the original free polyisocyanates. Such unblocking temperature is much higher than the $T_g$ (glass transition temperature) of lens substrates such as certain polythiourethanes or polyepisulfides, which can cause the lens to soften and distort. Deformation of the lens alters its optical properties.

U.S. Patent Application No 2005/0233153 discloses a method for manufacturing a plastic photochromic lens, which comprises preparing a liquid composition by dissolving in a suitable solvent a thermoplastic polyurethane polymer, at least one isocyanate terminated polyurethane pre-polymer, at least one photochromic compound and optionally stabilizers, then coating this liquid composition, evaporating the solvent at a temperature chosen in the range from 60 to 130° C. to form a photochromic polyurethane film of 5-150 µm thickness. The dried film is finally cured at room temperature for 1 day to 1 week and then at a temperature chosen in the range from 50 to 130° C. for 8 hours to 1 week.

U.S. Pat. No. 6,773,108 describes a lens coated with an elastomeric film having at least one photochromic dye dispersed therein. The film is obtained by dissolving the at least one photochromic compound in a coating solution comprising an elastomeric polyurethane pre-polymer, optionally an acrylate monomer and a solvent. Incorporation of polyfunctional alcohols in the solution is also envisioned, however, the disclosed alcohols are not polyols but functionalized monoalcohols having at least one alkoxide group, such as 2-butoxy ethanol (glycol ether) or polypropylene glycol methyl ether. Said coating solution is applied onto a lens and then air dried until tack free (for about 30 minutes), or air dried for 30 minutes and heat-dried at 95-100° C. for an additional 30 minutes to obtain a tack-free surface. This causes the polyurethane pre-polymer to form on the lens an elastomeric film possessing the beneficial characteristics of impact resistance and abrasion resistance.

SUMMARY OF THE INVENTION

It is a primary object of the present invention to provide a low temperature process for coating an article with a curable photochromic coating composition, which would be suitable to most plastic substrates.

It is another object of the present invention to provide such a coating process with short curing times.

Yet another object of the present invention is to devise a coating composition eliminating the need for a blocked polyisocyanate. Said coating composition could be used in an in-line-mixing process allowing for the possibility to reduce the curing temperature.

The present invention has been made in view of the above technical problems and provides a method of preparing photochromic coatings using short curing times and a lower curing temperature, so as to preserve the optical properties of the articles to be coated with.

Thus, a first embodiment of the instant invention is a process for obtaining an impact resistant, abrasion and/or scratch resistant photochromic article comprising a substrate having two main faces, comprising the following steps:

i) preparing a curable coating composition comprising at least one unblocked polyisocyanate terminated polyurethane pre-polymer, at least one polyol and at least one photochromic agent, and optionally at least one solvent;

ii) depositing the prepared curable coating composition onto at least part of a main face of the substrate;

iii) curing said curable coating composition for 10 minutes or less, at a temperature lower than or equal to 100° C. so as to form an impact resistant photochromic coating;

iv) forming an abrasion and/or scratch resistant coating on the impact resistant photochromic coating or forming a protective coating on the impact resistant photochromic coating and then forming an abrasion and/or scratch resistant coating on said protective coating.

Another embodiment of the invention is a curable coating composition comprising at least one unblocked polyisocyanate terminated polyurethane pre-polymer, at least one polyol, at least one photochromic agent, and optionally at least one solvent.

The embodiments of the invention are further drawn to an impact resistant photochromic polyurethane film obtainable by curing the above curable coating composition, and to an abrasion and/or scratch resistant article comprising a substrate having two main faces, at least one of which being coated with, starting from the substrate, said polyurethane film and an abrasion and/or scratch resistant coating, a protective coating being optionally interleaved between said polyurethane film and the abrasion and/or scratch resistant coating.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawing wherein.

DETAILED DESCRIPTION OF THE INVENTION AND PREFERRED EMBODIMENTS

Figure 1:
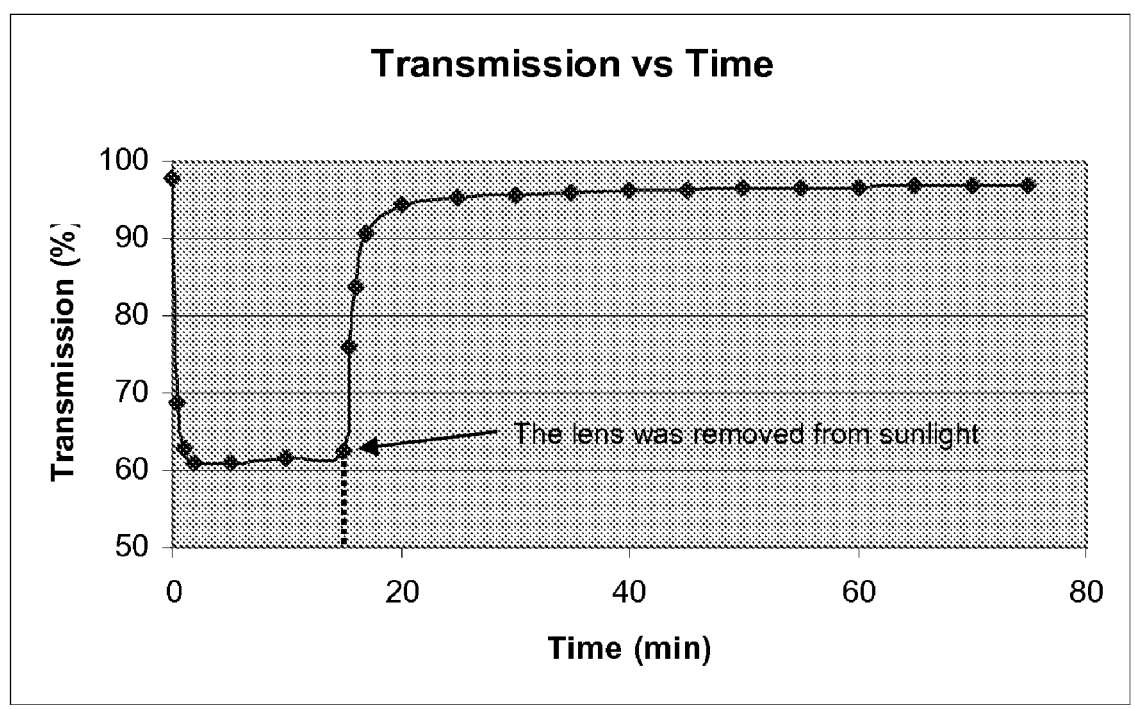
FIG. 1 represents the transmission factor in the visible spectrum as a function of time of an impact resistant, abrasion and/or scratch resistant photochromic ophthalmic lens according to the invention, which has been taken into the sunlight and then removed from sunlight.

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

In the present invention, in-line mixing technology is implemented, in which two components are used, an unblocked polyisocyanate terminated polyurethane pre-polymer and a polyol, that have a stable pot life until mixed together and thermally cured.

Compared to prior art processes which use isocyanate monomers, the present invention uses polyisocyanate pre-polymers which are more reactive at lower temperatures than polyisocyanate monomers.

The polyurethane matrix of the inventive impact resistant photochromic coating is formed by the catalyzed or uncatalyzed reaction of at least one polyurethane pre-polymer having at least two unblocked isocyanate terminal groups and at least one polyol (chain extender).

The number average molecular weight Mn of the polyurethane obtained by polymerization of the polyols and unblocked polyisocyanate terminated polyurethane pre-polymers will preferably vary from 10,000 to 100,000 g/mol.

A typical molecular weight for the polyurethane of the invention is Mn around 15,000, Mw (weight average molecular weight) from around 30,000 to around 32,000 with a polydispersity of around 2.00.

The components of the polymerizable, curable coating composition used in the process of the invention will first be described.

The polyols (abbreviation of polyhydric alcohols) which may be used in the present invention are defined as compounds comprising at least two hydroxyl groups, in other words diols, triols, tetrols etc. Polyols pre-polymers may be used.

Examples of polyols which may be used in the present invention include (1) polyols of low molecular weight, in other words polyols with a number average molecular weight less than 400, for example aliphatic diols, such as the $C_2$-$C_{10}$ aliphatic diols, triols, and higher polyols; (2) polyester polyols; (3) polyether polyols; (4) polyols containing amide groups; (5) polyacrylic polyols; (6) epoxypolyols; (7) polyvinyl polyols; (8) urethane polyols; and (9) mixtures of such polyols.

Polyols are preferably selected from polyols of low molecular weight, polyacrylic polyols, polyether polyols, polyester polyols and their mixtures, and, even more preferably, from the polyacrylic polyols, polyether polyols, polyester polyols and their mixtures. The particularly preferred polyols are polyester polyols.

Among polyols of low molecular weight suitable for the method of the present invention may be cited pentaerythritol, trimethylolethane, trimethylolpropane, di(triethylolpropane) dimethylolpropionic acid, ethylene glycol, 1,2- and 1,3-propylene glycol, 1,2-butanediol, 1,4-butanediol, 1,3-butanediol, 2,3-butanediol, 2,2,4-trimethyl-1,3-pentanediol, 1,5-pentanediol, 2,4-pentanediol, 1,6-hexanediol, 2,5-hexanediol, 1,8-octanediol, 2-methyl-1,3-pentanediol, 2,4-heptanediol, 2-ethyl-1,3-hexanediol, 2-methyl-1,3-propane diol, 2,2-dimethyl-1,3-propanediol (neopentyl glycol), 1,4-cyclohexanediol, 2,2-dimethyl-3-hydroxypropyl-2,2-dimethyl-3-hydroxypropionate, 1,2,6-hexanetriol, 1,2,4-butanetriol, glycerol, sorbitol, mannitol, diethylene glycol, triethylene glycol, tetraethylene glycol, dipropylene glycol, tripropylene glycol, dibutylene glycol, 1,4-bishydroxymethyl cyclohexane, 1,2-bis(hydroxymethyl)cyclohexane, 1,2-bis(hydroxyethyl)cyclohexane, the bis-hydroxypropylhydantoins, trishydroxyethylisocyanurate, the product of alkoxylation of 1 mole of 2,2-bis(4-hydroxyphenyl)propane (bisphenol A) and 2 moles of propylene oxide, and analogues, for example ethoxyled or propoxylated trimethylol or pentaerythritol, with a number average molecular weight of less than 400.

The polyether polyols are known compounds. By "polyether polyol", it is meant any polyether having at least two hydroxyl groups. The number average molecular weight of the polyether polyol generally falls within the range of 400 to 10,000, preferably from 500 to 6,000. Examples of polyether polyols include polyoxyalkylene polyols, polyalkoxylated polyols, such as for example the poly(oxytetramethylene) diols, and their mixtures.

The polyols containing amide groups, the epoxypolyols, the vinyl polyols, the urethane polyols and the polyacrylic polyols are also compounds known in the art. These and other polyols, as well as their methods of preparation are fully described in document WO 98/37115, which is incorporated herein by reference.

Polyester polyols are also well known compounds. By "polyester polyol", it is meant any polyester having at least two hydroxyl groups. The number average molecular weight of the polyester polyol generally falls within the range of 400 to 10,000, preferably 500 to 6,000.

The polyester polyols of the present invention can be prepared by known procedures from a polycarboxylic acid or acid derivative, such as an anhydride or ester of the polycarboxylic acid, and any polyhydric alcohol (polyol). The polyacid and/or polyol components may be used as mixtures of two or more compounds in the preparation of the polyester polyols.

The polyols used to prepare polyester polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. A preferred polyol component is a glycol. The glycols may contain heteroatoms (e.g., thiodiglycol) or may be composed solely of carbon, hydrogen and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. Examples of suitable polyols are the polyols of low molecular weight cited above.

The polycarboxylic acid component used to prepare polyester polyols may be aliphatic, cycloaliphatic, aromatic and/or heterocyclic and may optionally be substituted, for example, by halogen atoms and/or may be unsaturated. Anhydrides of the acids, where they exist, can also be employed and are encompassed by the term "polycarboxylic acid".

Examples of suitable carboxylic acids and derivatives thereof for the preparation of the polyester polyols include: oxalic acid, malonic acid, adipic acid, glutaric acid, succinic acid, pimelic acid, suberic acid, azelaic acid, sebacic acid, phthalic acid, phthalic acid anhydride, terephthalic acid, terephthalic anhydride, isophthalic acid, trimellitic acid, tetrahydrophthalic acid anhydride, pyromellitic dianhydride, hexahydrophthalic acid anhydride, tetrachlorophthalic acid anhydride, endomethylene tetrahydrophthalic anhydride, glutaric acid anhydride, maleic acid, maleic acid anhydride, terephthalic acid dimethylester, terephthalic acid-bis glycol ester, fumaric acid, dibasic and tribasic unsaturated fatty acids optionally mixed with monobasic unsaturated fatty acids, such as oleic acids.

The production of the polyester polyols can be accomplished by simply reacting the polycarboxylic acid or acid derivative with the polyol component in a known manner. After transesterification or esterification the reaction product can optionally be reacted with an alkylene oxide.

In addition, certain materials which react in a manner similar to polycarboxylic acids or acid derivatives to form polyester polyols can be used instead. Such materials include lactones, e.g., ε-caprolactone, propiolactone and butyrolactone, and ω-hydroxy acids such as hydroxycaproic acid and dimethylol propionic acid.

A particularly preferred family of polyester polyols is the family of polylactone polyols, which are obtained by simply reacting a lactone with a polyol. Among the polylactone polyols may be cited the polylactone diols, the polylactone triols, such as the polycaprolactone diols, the polypropiolactone diols, the polybutyrolactone diols, the polycaprolactone triols, the polypropiolactone triols, the polybutyrolactone triols.

Preferred polylactone polyols are polycaprolactone polyols, in particular those obtained by polymerizing ε-caprolactone using a polyol initiator such as neopentyl glycol, trimethylol propane, diethylene glycol, glycerol and mixtures thereof, or an amino alcool such as ethanolamine. Those products are commercially available from Solvay Chemicals under the trade name CAPA®. Examples are the pre-polymers CAPA® 2100, CAPA® 2100A, CAPA® 3050, CAPA® 2304 etc.

CAPA® 2100 and CAPA® 2100A are linear polyester diols derived from ε-caprolactone monomer and neopentyl glycol "initiator" corresponding to formula (I), terminated by primary hydroxyl groups. They have a molecular weight of 1,000 and a typical OH value of 112 mg KOH/g.

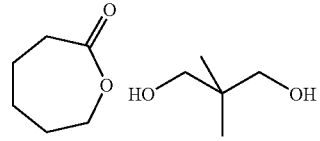

(I)

CAPA® 2304 is a linear polyester diol derived from ε-caprolactone monomer and diethylene glycol "initiator" corresponding to formula (II), terminated by primary hydroxyl groups. It has a molecular weight of 3000 and a typical OH value of 37 mg KOH/g.

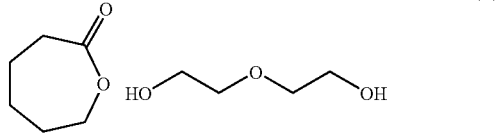

(II)

CAPA® 3050 is a low molecular weight branched polyester triol derived from ε-caprolactone monomer and trimethylol propane "initiator" corresponding to formula (III), terminated by primary hydroxyl groups. It has a molecular weight of 540 and a typical OH value of 310 mg KOH/g.

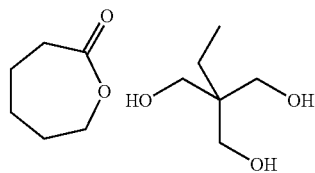

(III)

Other polycaprolactone triols which may be used in the curable coating composition are CAPA® 3022, which is a mixed polyester polyol derived from ε-caprolactone monomer and diethylene glycol/glycerol "initiators" having a molecular weight of 240, CAPA®4101, which is a branched polyester tetrol derived from ε-caprolactone monomer and penta-erythritol "initiator" having a molecular weight of 1,000, and CAPA® 3031, CAPA® 3041, CAPA® 3091 or CAPA® 3201, which are all polyester triols derived from ε-caprolactone monomer and trimethylol propane "initiator" (like CAPA® 3050), with molecular weights of 300, 400, 900 and 2000 g/mol, respectively.

The preferred polyols for the curable coating composition of the present invention are the polycaprolactone polyols, which provide good stability to hydrolysis and good low-temperature properties to the polyurethane formed by reaction with the polyisocyanate terminated polyurethane pre-polymer.

The most preferred polyols are those having at least three hydroxyl groups, i.e., those capable of cross-linking reactions, in particular polyester triols, and above all, polycaprolactone triols.

Generally, the polyols and unblocked polyisocyanate terminated polyurethane pre-polymers are comprised in the coating composition in an amount such that the molar ratio of NCO to OH groups is from 0.8 to 1.2.

The unblocked polyisocyanate terminated polyurethane pre-polymer used in the coating composition of the present invention can be obtained by reacting an excess of at least one polyisocyanate with at least one polyol. The polyol which may be used is such as the polyols components previously described.

By polyisocyanate, it is meant any compound comprising at least two isocyanate groups, in other words diisocyanates, triisocyanates, etc. Polyisocyanate pre-polymers may be used. The polyisocyanate component which may be used to synthesize the unblocked polyisocyanate terminated polyurethane pre-polymer includes polyisocyanate compounds with isocyanate groups which are "free", "blocked" or "partially blocked", and mixtures of "blocked" and "unblocked" compounds.

The term "blocked" means that the polyisocyanates have been changed in a known way to introduce urea (biurea derivative), carbodiimide, urethane (allophanate derivative), isocyanurate groups (cyclic trimer derivative), or by reaction with an oxime.

The polyisocyanates may be selected from aliphatic, aromatic, cycloaliphatic or heterocyclic polyisocyanates and mixtures thereof.

The polyisocyanates of the invention are preferably diisocyanates. Among the available diisocyanates may be cited toluene-2,4-diisocyanate, toluene-2,6-diisocyanate, diphenylmethane-4,4'-diisocyanate, diphenylmethane-2,4'-diisocyanate, paraphenylene diisocyanate, biphenyldiisocyanate, 3,3'-dimethyl-4,4'-diphenylene diisocyanate, tetramethylene-1,4-diisocyanate, hexamethylene-1,6-diisocyanate, 2,2,4-trimethyl hexane-1,6-diisocyanate, lysine methyl ester diisocyanate, bis(isocyanatoethyl) fumarate, isophorone diisocyanate (IPDI), ethylene diisocyanate, dodecane-1,12-diisocyanate, cyclobutane-1,3-diisocyanate, cyclohexane-1,3-diisocyanate, cyclohexane-1,4-diisocyanate, methylcyclohexyl diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, perhydro diphenylmethane-2,4'-diisocyanate, perhydro phenylmethane-4,4'-diisocyanate (or bis-(4-isocyanatocyclohexyl)-methane, or 4,4'-dicyclohexylmethanediisocyanate), and their mixtures.

The polyisocyanate compound is preferably an aliphatic diisocyanate. It is preferably selected from the group consisting of hexamethylene-1,6-diisocyanate, isophorone diisocyanate, ethylene diisocyanate, dodecane-1,12-diisocyanate, cyclohexane-1,3-diisocyanate, bis-(4-isocyanatocyclohexyl)-methane and their mixtures, and, even more preferably, from hexamethylene-1,6-diisocyanate, isophorone diisocyanate, ethylene diisocyanate, bis-(4-isocyanatocyclohexyl)-methane and their mixtures. The preferred polyisocyanate is bis-(4-isocyanatocyclohexyl)-methane. It is commercialized by Bayer under the trade name Desmodur W®.

Other suitable polyisocyanates for the method of the present invention are described in detail in the document WO 98/37115.

The most preferred curable coating composition according to the invention comprises at least one unblocked diisocyanate terminated polyurethane pre-polymer and at least one triol.

Generally, the polyols and polyisocyanates for preparing the unblocked polyisocyanate terminated polyurethane pre-polymer of the invention are used in an amount such that the molar ratio of NCO to OH groups is from 2:1 to 8:1, preferably from 2:1 to 4:1.

The number average molecular weight of the inventive polyurethane pre-polymer is preferably from 1,000 to 6,000, and more preferably from 1,500 to 4,000.

The photochromic compounds suitable for the present invention are generally organic compounds. A compound showing photochromic properties is defined as a compound capable to undergo, upon photo-irradiation, a reversible chemical transformation from a first state to a second state having a different absorption spectrum.

The photochromic compounds suitable for the present invention are compounds having at least one wavelength in the range from 400 to 700 nm characterized by a maximum absorption when excited by a light beam.

The photochromic compounds, which may be incorporated in the inventive curable coating composition, may be, without limitation, oxazine derivatives, for example spirooxazines, chromenes, photochromic derivatives of chromene such as pyranes, especially spiropyranes, fulgides, fulgimides, organometallic derivatives of dithizonate, and mixtures thereof. Heating may be required to solubilize the photochromic coatings in the coating composition.

Compounds comprising an oxazine group, in particular spirooxazines, are photochromic compounds that are well known in the art. They are described, among others, in the following documents: U.S. Pat. No. 4,562,172, U.S. Pat. No. 3,578,602, U.S. Pat. No. 4,215,010, U.S. Pat. No. 4,720,547, U.S. Pat. No. 5,139,707, U.S. Pat. No. 5,114,621, U.S. Pat. No. 5,529,725, U.S. Pat. No. 5,645,767, U.S. Pat. No. 5,658,501, WO 87/00524, WO 96/04590, JP 03251587, FR 2647789, FR 2647790, FR 2763070, EP 0245020 and EP 0783483.

The preferred oxazine compounds are spiro[indolino] benzoxazines, spiro[indolino] naphtoxazines and spiro[indolino] pyridobenzoxazines. Among preferred oxazine compounds are compounds comprising the following building block:

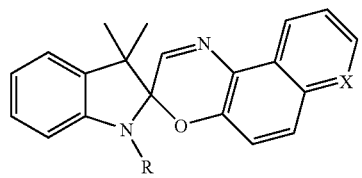

in which R is an alkyl group, linear or branched and X is a nitrogen or carbon atom. The aromatic positions of such compounds may be substituted. Specific examples of such compounds are compounds of formula (IV) to (VI) shown below:

(IV)

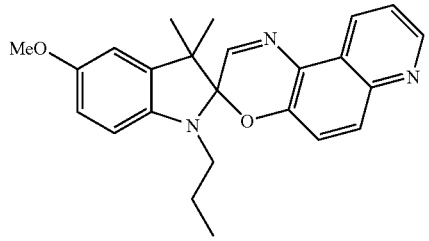

(V)

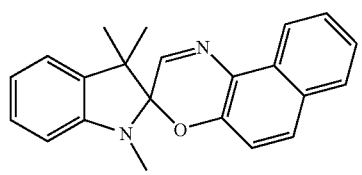

-continued (VI)

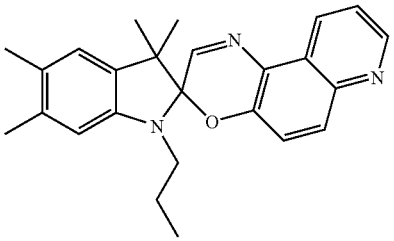

Chromenes and photochromic compounds of chromene are also well known and are described, among others, in the following documents: EP 0246114, EP 0401958, EP 0562915, EP 0629656, EP 0676401, FR 2688782, FR 2718447, WO 90/07507, WO91/06861, WO 93/17071, WO 94/20869, U.S. Pat. No. 3,567,605, U.S. Pat. No. 5,066,818, U.S. Pat. No. 5,395,567, U.S. Pat. No. 5,451,344, U.S. Pat. No. 5,645,767, U.S. Pat. No. 5,656,206 and U.S. Pat. No. 5,658,501.

Chromene is represented by the following formula:

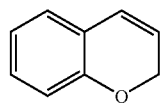

The preferred photochromic compounds of chromene may be represented by the formula:

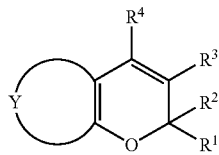

in which the group:

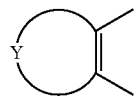

represents an optionally substituted hydrocarbon aromatic group or an optionally substituted unsaturated heterocyclic group, $R^1$ and $R^2$ represent identical or different groups chosen from a hydrogen atom, an hydrocarbon group optionally substituted with a substituted amino group, or are combined to form a cycle, and $R^3$ and $R^4$ represent identical or different groups chosen from a hydrogen atom and an hydrocarbon group optionally substituted with a substituted amino group.

Among those compounds, a first preferred category is that of naphtopyranes, in particular those bearing two optionally substituted phenyl groups on the carbon adjacent to the oxygen atom of the pyran ring.

Such photochromic compounds demonstrated excellent resistance to degradation with free radicals in aqueous medium. An example of such compound sis compound (VII) shown below:

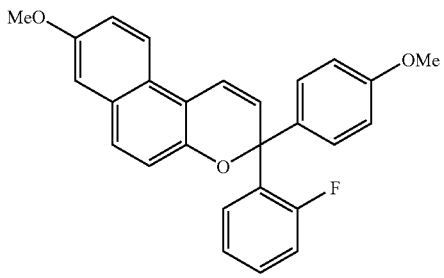

(VII)

A second preferred category of chromene derivatives is that of spiropyranes. Preferred spiropyranes comprise the following building block:

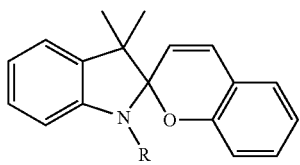

in which R is an alkyl group, linear or branched. The aromatic positions of such compounds may be substituted. An example of such compounds is compound (VIII) shown below:

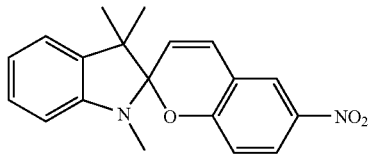

(VIII)

Photochromic fulgides and fulgimides compounds are known compounds and are described, among others, in patents U.S. Pat. No. 4,931,220 and EP 0629656.

Organometallic compounds of dithizonate are also known and described in U.S. Pat. No. 3,361,706.

The preferred photochromic compounds are chromene derivatives and oxazine derivatives such as benzoxazines and naphtoxazines, in particular spirooxazine derivatives such as spiro[indolino] benzoxazines, spiro[indolino] naphtoxazines and spiro[indolino] pyridobenzoxazines.

The photochromic compounds are generally present in an amount ranging from 0.1 to 10%, preferably from 0.3 to 5%, by weight relative to the total weight of the coating composition.

To improve the solubility of the photochromic compound in the coating composition, or to reduce the viscosity of the coating solution, an appropriate amount of a solvent may optionally be added to the mixture. Generally, the polyols and/or the polyurethane pre-polymers are mixed with an organic solvent such as N-methylpyrrolidone (NMP), tetrahydrofuran (THF), acetonitrile, dioxane or mixtures thereof before use. NMP is also particularly suitable to help solubilizing chromenes. The amount of solvent added is generally from 0 to 80%, preferably from 30 to 70% by weight, relative to the total weight of the coating composition.

The curable coating composition may also comprise at least one catalyst, preferably a tin or an amine catalyst, so as to accelerate the curing step. Tin catalysts may be chosen from the group consisting of tin octylate, stannous octoate (tin 2-ethylhexanoate), dibutyltin diacetate, dibutyltin dichloride (DBTDC), dibutyltin dilaurate (DBTDL), dibutyltin mercaptide, dibutyltin dimaleate, dimethyltin diacetate, dimethyltin dilaurate, dimethyltin mercaptide, dimethyltin dimaleate, triphenyltin acetate, triphenyltin hydroxide. Amine catalyst may be chosen from aliphatic or aromatic tertiary amines preferably containing a supplemental heteroatom in the ring or functional groups having a positive inductive and/or positive mesomeric effect (for example, alkyl groups or amino groups). Examples include 1,4-diazabicyclo[2.2.2]octane (DABCO), triethylamine, quinuclidine, 2,2'-dimorpholinodiethylether, N,N-dimethylpiperazine, 1-methylimidazole, 2-methyl-1-vinylimidazole, 1-allylimidazole, 1-phenylimidazole, 1,2,4,5-tetramethylimidazole, 1 (3-aminopropyl)imidazole, 4-dimethylaminopyridine, 4-pyrrolidino-pyridine, 4-morpholinopyridine, 4-methylpyridine, N-dodecyl-2-methylimidazole, triazines such as tris(dimethylaminopropyl) hexahydrotriazine, dimethylbenzylamine, bis-dimethylamino-ethylether and pentamethyl diethylenetriamine. Obviously, other metallic catalysts may be used, such as cobalt naphthenate.

The preferred catalysts are dibutlytin dilaurate, DBTDC and DABCO.

In general, the catalysts described above are used according to the invention in an amount ranging from 0.01 to 10%, preferably from 0.1 to 5% by weight based on the total weight of the coating composition.

The curable coating composition according to the invention may also contain various additives conventionally used in polymerizable compositions, in particular polymerizable compositions comprising photochromic agents, in conventional proportions. These additives include stabilizers such as antioxidants, UV light absorbers, agents for stabilizing the photochromic properties, e.g., light stabilizers, and anti-yellowing agents, or adhesion promoters, colorants, fragrances, and deodorants.

Light stabilizers, UV absorbers and antioxidants may be used to avoid that the photochromic lenses be subject to the loss of their ability to lighten and darken according to the level of light intensity due to problems of fatigue resistance and oxidation inherently associated with the photochromic compounds utilized. This can lead to a lens which becomes discolored (e.g., spotted), opaque, and/or which even reverses color (e.g., continually dark).

Light stabilizers are generally hindered amine light stabilizers (HALS), preferably tertiary hindered amine compounds. Preferred hindered amine light stabilizers include 8-acetyl-3-dodecyl-7,7,9,9-tetramethyl-1,3,8-triazospiro(4,5)decane-2,4-dione, bis(1,2,2,6,6-pentamethyl-4-piperidinyl)sebacate, methyl(1,2,2,6,6-pentamethyl-4-piperidinyl) sebacate, bis(2,2,6,6-tetramethyl-4-piperidinyl)sebacate, 2(2'-hydroxy-5-methyl-phenyl benzotriazole, [2,2-thiobis(4-tert-octylphenolato)]-n-butylamine nickel, dimethyl succinate polymer with 4-hydroxy-2,2,6,6-tetramethyl-1-piperidineethanol.

Antioxidants are generally hindered phenols or polyphenols. Preferred antioxidants include 1,1,3-tris(2-methyl-4-hydorxy-5-t-butylphenyl)butane, tetrakis-[methylene-3-(3', 5'-di-t-butyl-4'-hydroxy-phenyl)propionate]methane, 1,3,5-tris(3,5-di-t-butyl-4-hyroxybenzyl)-1,-3,5-triazine-2,4,6-(1H,3H,5H)trione, 1,3,5-trimethyl-2,4,6-tris(3,5-di-tert-butyl-4'-hydroxybenzyl)benzene, 1,3,5-tris(3,5-di-tert-butyl-4'-hydroxybenzyl)isocyanurate, 3,5-di-tert-butyl-4-hydroxyhydrocinnamic triester with 1,3,5-tris(2-hydroxyethyl)s-triazine-2,4,6-(1H,3H,5H)-trione, 1,3,5-tris (4-tert-butyl-3-hydroxy-2,6-dimethylbenzyl)s-triazine-2,4,6-(1H, 3H,5H)-trione, and mixtures of such antioxidants. Other antioxidants such as triphenylphosphine may also be used.

The UV light absorbers of the present invention include organic materials capable of absorbing UV-A ultraviolet radiation, i.e., wavelength in the range of from 320 to 400 nanometers, and more preferably, 350 to 400 nanometers. Specific groups of organic ultraviolet light absorbers of the present invention include: 2-hydroxybenzophenones, 2-hydroxyphenylbenzotriazoles, oxalanilides, 2-hydroxyphenyltriazines, cinnamates, salicylates, formamidines and mixtures thereof. Oxalanilides UV light absorbers are described, for example, in U.S. Pat. No. 5,391,327 and U.S. Pat. No. 3,906,041.

Preferably, the UV light absorbers are selected from the group consisting of 2-hydroxy-4-methoxy benzophenone, hydroxy-4-n-octoxybenzophenone, 2,2'-dihydroxy-4-methoxybenzophenone, 2-(2-hydroxy-5-t-octylphenyl)benzotriazole, esters of aminobenzoic acid, 2,4-bis(2,4-dimethylphenyl)-6-(2-hydroxy-4-iso-octylphenyl)-1,3,5-triazine, o-ethoxy-o-ethyl oxalic bis anilide, 2-(2H-benzotriazol-2-yl)-4,6-bis(1,1-dimethylpropyl)phenol, N-(2-ethoxyphenyl)-N'-(4-isododecylphenyl)ethanediamide, 2-cyano-3,3-diphenyl-2-propenoic acid, ethyl ester, and mixtures thereof.

A sufficient amount of those stabilizers must be used in order to be effective at reducing fatigue resistance of the photochromic material.

Anti-yellowing agents such as, without limitation, 3-methyl-but-2-en-1-ol (M-BOL) and those described in U.S. Pat. No. 5,442,022, U.S. Pat. No. 5,445,828, U.S. Pat. No. 5,702, 825, U.S. Pat. No. 5,741,831 and FR 2699541 may be used, alone or in combination.

Fragrances make it possible to mask the odour of the compositions, in particular during surface working operations.

Once the curable coating composition according to the invention has been prepared, it is deposited onto at least part of a main face of the substrate of the article, preferably onto said entire main face, by any of the methods used in coating technology such as, for example, spray coating, spin coating, spread coating, dip coating or roll-coating. Spin coating is the preferred method.

The article to be coated according to the present invention is preferably an optical article, more preferably a transparent optical article, such as an optical lens or lens blank, and more particularly an ophthalmic lens or lens blank.

Both main faces of the article may be coated according to the method of the invention.

Herein, the term "lens" means an organic or inorganic glass lens, comprising a lens substrate which may be coated with one or more coatings of various natures.

When the optical article comprises one or more surface coatings, the term "to deposit a layer onto the article" means that a layer is deposited onto the outermost coating of the article.

The substrate may be made of mineral glass or organic glass, preferably organic glass. The organic glass substrate can be made of any material currently used for organic ophthalmic lenses, e.g., either thermoplastic materials such as thermoplastic polycarbonates and polyurethanes, or thermosetting (cross-linked) materials, such as: those obtained by polymerization of allyl derivatives such as the allyl carbonates of linear or branched aliphatic or aromatic polyols, such as ethylene glycol bis(allyl carbonate), diethylene glycol bis (2-methyl carbonate), diethylene glycol bis(allyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis (allyl carbonate), isopropylene bisphenol A bis(allyl carbonate), poly(meth)acrylates and copolymers based substrates, such as substrates obtained by the polymerization of alkyl methacrylates, in particular $C_1$-$C_4$ alkyl methacrylates such as methyl (meth)acrylate and ethyl (meth)acrylate, substrates comprising (meth)acrylic polymers and copolymers derived from bisphenol-A, polyethoxylated aromatic (meth)acrylates such as the polyethoxylated bisphenolate di(meth)acrylates, polythio(meth)acrylates, thermosetting polyurethanes, polythiourethanes, polyepoxides, polyepisulfides, as well as copolymers thereof and blends thereof. By (meth)acrylate, it is meant a methacrylate or an acrylate.

The substrates particularly recommended are substrates obtained by polymerization or copolymerization of diethylene glycol bis(allyl carbonate), sold under the trade name CR-39® by PPG INDUSTRIES (ORMA® ESSILOR lens).

Among other recommended substrates are substrates obtained by polymerization of thio(meth)acrylic monomers, such as those disclosed in the French patent application FR 2734827.

The substrates may obviously be obtained by polymerising mixtures of the above monomers.

Polycarbonate (thermoplastic) substrates and certain polythiourethane or polyepisulfide substrates are especially recommended substrates for applying the inventive coating compositions, since those substrates cannot be imbibed with a solution comprising photochromic compounds (thermal transfer technique), or can be imbibed but result in low activation and deactivation times of the photochromic compound.

The surface of the article onto which the inventive impact resistant photochromic film will be deposited may optionally be subjected to a pretreatment step intended to improve adhesion, for example a high-frequency discharge plasma treatment, a glow discharge plasma treatment, a corona treatment, an electron beam treatment, an ion beam treatment, an acid or base treatment.

The inventive impact resistant photochromic film may be deposited onto a naked substrate or onto the outermost coating layer of the substrate if the substrate is coated with surface coatings, preferably onto a naked substrate.

The deposited curable coating composition is then thermally cured, for example by infrared curing, for 10 minutes or less, preferably 5 minutes or less, and more preferably 4 minutes or less, at a temperature lower than or equal to 100° C., preferably lower than or equal to 95° C., more preferably lower than or equal to 90° C., and even better lower than or equal to 85° C., so as to form an impact resistant photochromic film.

Curing said coating composition at such low temperature cure for such a short time does not necessary allow for obtaining a completely cured film. The present curing treatment may thus result in a completely cured impact resistant photochromic coating, or an incompletely cured impact resistant photochromic coating. In the latter case, said coating may be tacky or non tacky at 20-25° C.

The term "tacky" as used herein is intended to designate the sticky nature of a coating. That the formed photochromic film still presents a tacky surface at 20-25° C. after curing according to step iii) of the process of the invention can be simply determined by the touch, by what is referred to as the thumb test in which the thumb is pressed against the surface being considered and then removed to determine the tacky or sticky nature of the surface. A substantially more accurate and reproducible test, however, is the probe tack test designated D 2979-88 by the American Society for Testing and Materials. In this test values are given in grams of force required to remove the end of a stainless steel rod, 5.0 mm in diameter, from the surface of an adhesive coating at a speed of 10 mm per second to which it has been adhered for 1.0 second (contact speed 10 mm/second). Tackiness can be reduced by altering the NCO/OH ratio, for example, or by increasing the amount of curing catalyst.

Even if the photochromic film is still tacky when the subsequent coating is deposited thereon, and even if interpenetration of both layers may occur, the photochromic and impact resistance properties of the film have been found to remain surprisingly unaffected.

The energy source used to cure the coating may be any conventional heating source, for example an infrared curing system or a convection oven.

The subsequent coating, which is deposited onto the impact resistant photochromic film, is an abrasion and/or scratch resistant (hard coat) or a protective coating.

Any known optical abrasion- and/or scratch-resistant coating composition can be used to form the abrasion- and/or scratch-resistant coating of the invention. Thus, the abrasion- and/or scratch-resistant coating composition can be a UV and/or a thermal curable composition.

By definition, an abrasion- and/or scratch-resistant coating is a coating which improves the abrasion- and/or scratch-resistance of the finished optical article as compared to a same optical article but without the abrasion- and/or scratch-resistant coating. Generally, abrasion- and/or scratch-resistant coatings are poly(meth)acrylate based or silicon based hard coatings. The term (meth)acrylate means either methacrylate or acrylate.

The main component of the (meth)acrylate based coating compositions may be chosen from monofunctional (meth)acrylates, multifunctional (meth)acrylates such as difunctional (meth)acrylates, trifunctional (meth)acrylates, tetrafunctional (meth)acrylates, pentafunctional (meth)acrylates, hexafunctional (meth)acrylates, and mixtures thereof.

Examples of monomers which may be used as main components of (meth)acrylate based coating compositions are:

Monofunctional (meth)acrylates: Allyl methacrylate, 2-ethoxyethyl acrylate, 2-ethoxyethyl methacrylate, caprolactone acrylate, isobornyl methacrylate, lauryl methacrylate, polypropylene glycol monomethacrylate.

Difunctional (meth)acrylates: 1,4-butanediol diacrylate, 1,6-hexanediol diacrylate, 1,6-hexanediol dimethacrylate, polyethylene glycol diacrylate, tetraethylene glycol diacrylate, polyethylene glycol dimethacrylate, polyethylene glycol diacrylate, ethoxylated bisphenol A diacrylate, tetraethylene glycol diacrylate, tripropylene glycol diacrylate, neopentyl glycol diacrylate, 1,4-butanediol dimethacrylate, tetraethylene glycol dimethacrylate, diethylene glycol diacrylate.

Trifunctional (meth)acrylates: trimethylolpropane trimethacrylate, trimethylolpropane triacrylate, pentaerythritol triacrylate, ethoxylated trimethylolpropane triacrylate, trimethylolpropane trimethacrylate.

Tetra to hexa(meth)acrylates: Dipentaerythritol pentaacrylate, pentaerythritol tetraacrylate, ethoxylated pentaerythritol tetraacrylate, pentaacrylate esters.

Other preferred abrasion- and/or scratch-resistant coatings are silicon containing coatings, especially those obtained by curing a precursor composition including silanes or a hydrolyzate thereof, preferably epoxysilanes, and more preferably the epoxyalkoxysilanes disclosed in FR 2702486 (EP 0614957), WO 94/10230, U.S. Pat. No. 4,211,823 and U.S. Pat. No. 5,015,523.

A particularly preferred composition for an abrasion- and/or scratch-resistant coating is disclosed in FR 2702486. Said preferred composition comprises a hydrolyzate of an epoxytrialkoxysilane and dialkyldialkoxysilane, colloidal mineral fillers and a catalytic amount of an aluminum-based curing catalyst, the remaining of the composition being essentially comprised of solvents typically used for formulating these compositions.

Especially preferred epoxyalkoxysilane based abrasion- and/or scratch-resistant coating compositions are those comprising as the main constituents a hydrolyzate of γ-glycidoxypropyl-trimethoxysilane (GLYMO) as the epoxytrialkoxysilane component, a hydrolyzate of dimethyl-diethoxysilane (DMDES) as the dialkyldialkoxysilane component, colloidal silica and a catalytic amount of aluminum acetylacetonate.

In order to improve the adhesion of the abrasion- and/or scratch-resistant coating to the impact-resistant primer coating, an effective amount of at least one coupling agent can be added to the abrasion- and/or scratch-resistant coating composition. The preferred coupling agent is a precondensed solution of an epoxyalkoxysilane and an unsaturated alkoxysilane, preferably comprising a terminal ethylenic double bond.

Examples of epoxyalkoxysilanes are GLYMO, γ-glycidoxypropyl-pentamethyldisiloxane, γ-glycidoxypropyl-methyl-diisopropenoxysilane, γ-glycidoxypropyl-methyl-diethoxysilane, γ-glycidoxypropyl-dimethyl-ethoxysilane, γ-glycidoxypropyl-diisopropyl-ethoxysilane and γ-glycidoxypropyl-bis (trimethylsiloxy) methylsilane. The preferred epoxyalkoxysilane is GLYMO.

The unsaturated alkoxysilane can be a vinylsilane, an allylsilane, an acrylic silane or a methacrylic silane.

Examples of vinylsilanes are vinyltris(2-methoxyethoxy) silane, vinyltrisisobutoxysilane, vinyltri-tert-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxysilane, vinylbis (trimethylsiloxy) silane and vinyldimethoxyethoxysilane.

Examples of allylsilanes are allyltrimethoxysilane, alkyltriethoxysilane and allyltris(trimethylsiloxy)silane.

Examples of acrylic silanes are 3-acryloxypropyltris(trimethylsiloxy) silane, 3-acryloxy-propyl-trimethoxysilane, acryloxy-propylmethyl-dimethoxysilane, 3-acryloxypropyl-methylbis(trimethylsiloxy)silane, 3-acryloxypropyldimethylmethoxysilane, N-(3-acryloxy-2-hydroxypropyl)-3-aminopropyltriethoxysilane.

Examples of methacrylic silanes are 3-methacryloxypropyltris (vinyldimethoxylsiloxy)silane, 3-methacryloxypropyltris(trimethylsiloxy)silane, 3-methacryloxypropyltris (methoxyethoxy)silane, 3-methacryloxypropyl-trimethoxysilane, 3-methacryloxypropyl-pentamethyldisiloxane, 3-meth-acryloxy-propyl-methyldimethoxysilane, 3-methacryloxy-propylmethyldiethoxy-silane, 3-methacryloxypropyl-dimethyl-methoxysilane, 3-methacryloxy-propyl-dimethylethoxysilane, 3-methacryloxy-propenyltrimethoxysilane and 3-methacryloxy-propylbis(trimethylsiloxy) methylsilane. The preferred silane is acryloxypropyl trimethoxysilane.

Preferably, the amounts of epoxyalkoxysilane(s) and unsaturated alkoxysilane(s) used for the coupling agent preparation are such that the weight ratio:

$$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight. The coupling agent preferably comprises less than 40% by weight of liquid water and/or organic solvent, more preferably less than 35% by weight.

The expression "weight of solid material from epoxyalkoxy silanes and unsaturated alkoxysilanes" means the theoretical dry extract from those silanes which is the calculated weight of unit $Q_k Si O_{(4-k)/2}$ where Q is the organic group that bears the epoxy or unsaturated group and $Q_k Si O_{(4-k)/2}$ comes from $Q_k Si R'O_{(4-k)}$ where Si—R' reacts to form Si—OH on hydrolysis. k is an integer from 1 to 3 and is preferably equal to 1. R' is preferably an alkoxy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprise:
1) mixing the alkoxysilanes
2) hydrolyzing the alkoxysilanes, preferably by addition of an acid, such a hydrochloric acid
3) stirring the mixture
4) optionally adding an organic solvent
5) adding one or several catalyst(s) such as aluminum acetylacetonate
6) Stirring (typical duration: overnight).

Typically, the amount of coupling agent introduced in the abrasion and/or scratch-resistant coating composition represents 0.1 to 15% by weight of the total composition weight, preferably 1 to 10% by weight.

The abrasion- and/or scratch-resistant coating composition can be applied onto the impact-resistant photochromic coating (or onto a protective coating as explained below) using any classical method such as spin, dip or flow coating, preferably spin coating.

The abrasion- and/or scratch-resistant coating composition can be simply dried or optionally pre-cured before application of a subsequent coating. Depending upon the nature of the abrasion- and/or scratch-resistant coating composition, thermal curing, UV-curing or a combination of both can be used. Preferably, the abrasion- and/or scratch-resistant coating composition is thermally curable.

Thickness of the abrasion- and/or scratch-resistant coating, after curing, usually ranges from 1 to 15 µm, preferably from 2 to 6 µm, more preferably from 3 to 5 µm.

Abrasion and/or scratch resistant coating compositions may comprise organic solvents, in particular alcoholic solvents, which may dissolve the inventive photochromic film since it may be still tacky and/or not completely cured according to step iii) of the inventive process.

Moreover, cracking of the photochromic polyurethane film sometimes occurs when abrasion and/or scratch resistant coating compositions, specifically of the silicon type, are directly deposited thereon.

Preferably, the photochromic film is cured until reaching a state in which it is not able to be dissolved when contacted by a subsequent coating deposited thereon, with a maximum curing temperature of 100° C. and a maximum curing time of 10 minutes.

Potential deterioration of the photochromic film due to the subsequent hard coat depends on the nature of the hard coat, on the nature of the solvent which may be present in the hard coat composition, and also on the coating process. Deterioration may especially occur when the abrasion and/or scratch resistant coating is a silicon based coating, and even more especially occur when the abrasion and/or scratch resistant coating is a silicon based coating deposited by dip coating.

To limit the risk of deterioration of polyurethane films, it is well known in the art to interleave a protective coating between said film and the abrasion and/or scratch resistant coating. This has also been found useful in the case of the present photochromic polyurethane coating.

According to the invention, the protective coating is formed from a protective coating composition which contains no alcoholic solvent, and preferably no solvent.

The preferred protective coating is an acrylate based coating. The main components of the (meth)acrylate based coating compositions may be chosen from monofunctional (meth)acrylates, multifunctional (meth)acrylates and mixtures thereof, which have already been described above in the case of the abrasion and/or scratch resistant coating. Preferably, the protective coating composition comprises at least one multifunctional (meth)acrylate, preferably at least one (meth)acrylated polyol, i.e., the reaction product of a polyol and (meth)acrylic acid.

The protective coating composition may contain additives such as surfactants and/or photo-initiators.

Surfactants may be anionic, cationic, neutral or amphoteric.

Examples of photo-initiators that generate free radicals upon exposure to ultraviolet light or heat include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Specific examples of photo-initiators are those commercialized by Ciba Specialty Chemicals under the trade names IRGACURE® or DAROCUR®. Photoinitiators are generally present in an amount ranging from 0.1 to 10% by weight, relative to the total weight of the protective coating composition, if it is a UV-curable composition.

The above photo-initiators may also be used in the abrasion- and/or scratch-resistant coating composition if it is UV-curable.

The protective coating composition can be applied onto the impact-resistant photochromic coating using any classical method such as spin, dip or flow coating, preferably spin coating.

Once deposited, the protective coating composition can be simply dried or optionally pre-cured before application of a subsequent coating. Depending upon its nature, thermal curing, UV-curing or a combination of both can be used.

In the case when the inventive photochromic film is not completely cured following step iii) of the inventive process, complete curing of said film can be achieved during the curing step of the abrasion and/or scratch resistant coating, if it requires a thermal cure, albeit it can also be achieved during the curing step of the protective coating, if any, and if the latter coating requires a thermal cure, or it can be achieved during the thermal curing step of a subsequent coating.

Performing two curing steps in once is very interesting since it shortens duration of the process for manufacturing the photochromic article.

Preferably, any subsequent coating requiring thermal curing, for example the abrasion and/or scratch resistant coating or the protective coating, is cured at a temperature lower than or equal to 100° C., preferably lower than or equal to 95° C., more preferably lower than or equal to 90° C., and even better lower than or equal to 85° C.

If none of the coatings which are successively deposited onto the inventive impact resistant photochromic coating require a thermal cure, in particular the abrasion and/or scratch resistant coating and the protective coating (e.g., all subsequent coatings are UV cured), an additional thermal curing step of the photochromic film has to be performed if the curing treatment according to step iii) of the inventive process did not allow for obtaining a completely cured coating.

Said additional thermal curing step is performed at a temperature lower than or equal to 100° C., preferably lower than or equal to 95° C., more preferably lower than or equal to 90° C., and even better lower than or equal to 85° C. It may be performed at any time after step iii) of the process according to the invention.

Thickness of the final, completely cured impact-resistant photochromic coating typically ranges from 0.05 to 150 μm, preferably from 0.5 to 50 μm, more preferably from 0.6 to 30 μm, and even better from 0.6 to 20 μm.

It is possible to apply other coatings onto the abrasion and/or scratch resistant coating, such as, without limitation, an anti-reflection coating, a hydrophobic and/or oleophobic coating (anti-fouling top coat), a polarized coating or a dyeing coating.

If an anti-reflection coating is applied onto the abrasion-and/or scratch-resistant coating, it is possible to subject the surface of the abrasion and/or scratch-resistant coating to a corona treatment or a vacuum plasma treatment, in order to increase adhesion.

As stated above, the article according to the invention may additionally contain an anti-reflection coating deposited onto the abrasion and/or scratch resistant coating.

Anti-reflection coatings and their methods of making are well known in the art. The anti-reflection can be any layer or stack of layers which improves the anti-reflective properties of the finished optical article. The anti-reflection coating may be a mono- or multilayered anti-reflection coating, and preferably comprises a mono- or multilayered film of dielectric materials such as SiO, $SiO_2$ $Si_3N_4$, $TiO_2$, $ZrO_2$, $Al_2O_3$, $MgF_2$ or $Ta_2O_5$, or mixtures thereof. It is thus possible to prevent the appearance of a reflection at the article-air interface.

This anti-reflection coating is generally applied by vacuum deposition according to one of the following techniques: i) by evaporation, optionally assisted by ion beam; ii) by ion-beam spraying; iii) by cathodic spraying; iv) by chemical vapour deposit assisted by plasma.

In addition to vacuum deposition, the anti-reflection coating can also be applied by depositing a liquid solution, preferably by a spin coating process. As an example, it is possible to apply an inorganic layer by the sol/gel route, for example from a tetraethoxysilane hydrolyzate.

In the case of a single layer film, its optical thickness is preferably equal to $\lambda/4$, where $\lambda$ is a wavelength of 450 to 650 nm.

In the case of a multilayer film comprising three layers, a combination may be used corresponding to the respective optical thicknesses $\lambda/4, \lambda/2, \lambda/4$ or $\lambda/4, \lambda/4, \lambda/4$.

It is also possible to use an equivalent film formed by more layers, in the place of any number of the layers which are part of the above three layers.

Preferably, the anti-reflection coating is a multilayer film comprising three or more dielectric material layers of alternatively high and low refractive indexes.

A preferred anti-reflection coating may comprises a stack of four layers formed by vacuum deposition, for example a first $SiO_2$ layer having an optical thickness of about 100 to 160 nm, a second $ZrO_2$ layer having an optical thickness of about 120 to 190 nm, a third $SiO_2$ layer having an optical thickness of about 20 to 40 nm and a fourth $ZrO_2$ layer having an optical thickness of about 35 to 75 nm.

A layer of an anti-fouling top coat may be used in the present invention. It is preferably deposited onto at least part of the above antireflection coating, preferably onto the entire surface of said coating.

The anti-fouling top coat is defined as a hydrophobic and/or oleophobic surface coating. The ones preferably used in this invention are those which reduce surface energy of the article to less than 20 $mJ/m^2$. The invention has a particular interest when using anti-fouling top coats having a low surface energy, preferably of less than 14 $mJ/m^2$ and even better less than 12 $mJ/m^2$.

The surface energy values referred above are calculated according to Owens Wendt method, described in the following document: Owens, D. K.; Wendt, R. G. "Estimation of the surface force energy of polymers ", J. Appl. Polym. Sci. 1969, 51, 1741-1747.

The anti-fouling top coat according to the invention is preferably of organic nature. By organic nature, it is meant a layer which is comprised of at least 40% by weight, preferably at least 50% by weight of organic materials, relative to the total weight of the coating layer. A preferred anti-fouling top coat is made from a liquid coating material comprising at least one fluorinated compound.

Hydrophobic and/or oleophobic surface coatings most often comprise silane-based compounds bearing fluorinated groups, in particular perfluorocarbon or perfluoropolyether group(s). By way of example, silazane, polysilazane or silicone compounds are to be mentioned, comprising one or more fluorine-containing groups such as those mentioned here above. Such compounds have been widely disclosed in the previous art, for example in Patents U.S. Pat. No. 4,410, 563, EP 0203730, EP 749021, EP 844265 and EP 933377.

A classical method to form an anti-fouling top coat consists in depositing compounds bearing fluorinated groups and Si—R groups, R representing an —OH group or a precursor thereof, such as —Cl, —$NH_2$, —NH— or —O-alkyl, preferably an alkoxy group. Such compounds may perform, at the surface onto which they are deposited, directly or after hydrolysis, polymerization and/or cross-linking reactions with pendent reactive groups.

Preferred fluorinated compounds are silanes and silazanes bearing at least one group selected from fluorinated hydrocarcarbons, perfluorocarbons, fluorinated polyethers such as $F_3C$—$(OC_3F_6)_{24}$—O—$(CF_2)_2$—$(CH_2)_2$—O—$CH_2$—$Si(OCH_3)_3$ and perfluoropolyethers, in particular perfluoropolyethers.

Commercial compositions for making anti-fouling top coats are the compositions KY130 and KP 801M commercialized by Shin-Etsu Chemical and the composition OPTOOL DSX (a fluorine-based resin comprising perfluoropropylene moieties) commercialized by Daikin Industries. OPTOOL DSX is the most preferred coating material for anti-fouling top coats.

The liquid coating material for forming the anti-fouling top coat of the invention may comprise one or more of the above cited compounds. Preferably, such compounds or mixtures of compounds are liquid or can be rendered liquid by heating, thus being in a suitable state for deposition.

The deposition techniques for such anti-fouling top coats are very diverse, including liquid phase deposition such as dip coating, spin coating (centrifugation), spray coating, or vapor phase deposition (vacuum evaporation). Of which, deposition by spin or dip coating is preferred.

If the anti-fouling top coat is applied under a liquid form, at least one solvent is added to the coating material so as to prepare a liquid coating solution with a concentration and viscosity suitable for coating. Deposition is followed by curing.

In this connection, preferred solvents are fluorinated solvents and alcanols such as methanol, preferably fluorinated solvents. Examples of fluorinated solvents include any partially or totally fluorinated organic molecule having a carbon chain with from about 1 to about 25 carbon atoms, such as fluorinated alkanes, preferably perfluoro derivatives and fluorinated alkyl ether oxides, preferably perfluoroalkyl alkyl ether oxides, and mixtures thereof. As fluorinated alkanes, perfluorohexane ("Demnum" from DAIKIN Industries) may be used. As fluorinated ether oxides, methyl perfluoroalkyl ethers may be used, for instance methyl nonafluoro-isobutyl ether, methyl nonafluorobutyl ether or mixtures thereof, such as the commercial mixture sold by 3M under the trade name HFE-7100. The amount of solvent in the coating solution preferably ranges from 80 to 99.99% in weight.

The present invention also relates to a curable coating composition comprising at least one unblocked polyisocyanate terminated polyurethane pre-polymer, at least one polyol, at least one photochromic agent, and optionally at least one solvent. All components of said curable coating composition are such as described above.

The present invention further relates to an impact resistant photochromic polyurethane film obtainable or obtained by curing the above curable coating composition. Preferably, its thickness ranges from 0.05 to 150 μm, more preferably from 0.5 to 50 μm, still more preferably from 0.6 to 30 μm, and even better from 0.6 to 20 μm.

As described before, the curable coating composition is preferably cured for 10 minutes or less, at a temperature lower than or equal to 100° C.

Said polyurethane film can be stored on a carrier by depositing the above curable coating composition onto a carrier instead of at least part of a main face of the substrate, and then curing said curable coating composition for 10 minutes or less, at a temperature lower than or equal to 100° C. The stored film may be later used in the process of the invention by transfer from the carrier to at least part of a main face of the substrate.

The carrier may optionally bear at least one other functional coating. Obviously, the coatings are applied on the surface of the carrier in the reverse order with regard to the desired order of the coating stack on the lens substrate.

The present invention finally relates to an abrasion and/or scratch resistant article obtainable by the inventive process, comprising a substrate having two main faces, at least one of which being coated with an impact resistant photochromic polyurethane coating in which at least one photochromic compound is dispersed, said photochromic polyurethane coating being coated with an abrasion and/or scratch resistant coating or a protective coating itself coated with an abrasion and/or scratch resistant coating. The impact resistant photochromic polyurethane coating can be prepared from the above described curable coating composition.

The article is preferably a photochromic ophthalmic lens. It exhibits impact resistance properties due to the presence of the polyurethane coating.

The invention is further illustrated by the examples described below. These examples are meant to illustrate the invention and are not to be interpreted as limiting the scope of the invention.

Unless otherwise noted, number average molecular weights are expressed in g/mol.

EXAMPLES

The photochromic dyes cited in the following examples are Photosol® dyes that can be obtained from PPG/Transition Opticals.

Example 1

Preparation of an Unblocked NCO Terminated Polyurethane Pre-Polymer According to the Invention A 1 liter glass reactor with a separate 3 neck top was charged with 142.87 g of the polyester diol CAPA® 2100A (142 mmol). CAPA® 2100A being a wax like material at room temperature, it was necessary to warm this compound to 60° C. to reduce the viscosity so that it could be charged to the reaction vessel under a liquid form. A heating mantle was used as the source of heat and a condenser was attached to a chiller set at 10° C. The system was constantly supplied with inert gas (dry nitrogen).

76.1 g of dicyclohexylmethane-4,4'-diisocyanate (Desmodur W®, 290 mmol, molar ratio of NCO/OH=2.04) were added to the vessel and the heating mantle temperature was set to 105° C. The reaction was monitored by checking the refractive index and observing the elimination of the —OH peak by FT-IR. It could be seen from the data that the refractive index levels off after 1 hour, indicating that the reaction is complete. This was confirmed with the disappearance of the —OH peak (between 3400 and 3600 cm$^{-1}$) and appearance of a —NH peak (between 3300 and 3500 cm$^{-1}$) in the IR absorption spectrum of the mixture.

The final pre-polymer is semi-solid at room temperature. It has the consistency of honey when heated to 80° C.

Examples 2 to 5

Preparation of Ophthalmic Lenses Coated with an Impact Resistant Photochromic Film According to the Invention For those experiments, a Headway was used as a spin coater and a LESCO EZ-IR curing system (FBM1004) was used as a curing system. Table 1 indicates the curing temperature (temperature of the lens surface measured with Omegascope OS531) as a function of the curing time and curing system setting. The lenses can be placed in the LESCO EZ-IR curing system set at 575, 700, 725 or 800° C. (IR temperature) for 45, 90, 135 or 180 seconds. Grey colored cells correspond to lenses prepared according to the process of the invention.

TABLE 1

Correspondence between the curing temperature and the curing system setting.

| Curing time (seconds) | Temperature of the lens surface (curing T) | | | |
| --- | --- | --- | --- | --- |
| | curing system set at 575° C. | curing system set at 700° C. | curing system set at 725° C. | curing system set at 800° C. |
| 45 | — | — | — | 105° C. |
| 90 | — | 112° C. | 130° C. | 145° C. |
| 135 | — | 133° C. | 142° C. | 175° C. |
| 180 | 104° C. | 146° C. | 150° C. | 190° C. |

Example 2

Coating compositions were prepared in the following manner. The pre-polymer of example 1 (5.45 g) was mixed with THF (4.55 g). Then, the catalyst dibutyltin dichloride (DBTDC, 0.07 g for example 2.1, 0.15 g for example 2.2), photochromic dye 7-120 (0.0114 g for example 2.1, 0.114 g for example 2.2) and photochromic dye 7-176 (0.0070 g) were added and mixed until dissolved. A small amount of heat (heat gun) was required to dissolve dyes into the solution. A solution comprising the polyester triol CAPA® 3050 (1.92 g, molar ratio of NCO/OH=1) and THF (0.95 g) was added to the coating composition and sonication was used to remove bubbles.

Both prepared coating compositions were each spin coated (500 rpm for 10 s increased to 1000 rpms for 30 s) onto clean CR-39® piano lenses. The lenses were placed in the LESCO EZ-IR curing system set at 700° C. for 45 or 90 seconds.

It was observed that the prepared polyurethane coatings were still tacky (to the touch). Those lenses were subjected to sunlight to verify photochromic change. The coating did change color and reversed when removed from sunlight.

Example 3

The same coating compositions as in example 2 were prepared, except for the amount of DBTDC catalyst (0.1288 g for example 3.1, 0.2576 g for example 3.2).

Both prepared coating compositions were each spin coated as in example 2 onto clean CR-39® piano lenses. The lenses were placed in the LESCO EZ-IR curing system set at 575° C. for 45, 90 or 135 seconds. Table 2 indicates the observed tackiness state of the prepared polyurethane coatings. Those lenses were subjected to sunlight to verify photochromic change. The coating did change color and reversed when removed from sunlight.

TABLE 2

| Curing temperature | Example 3.1 | Example 3.2 |
| --- | --- | --- |
| 65° C. | Tacky | Tacky |
| 85° C. | Less tacky | Less tacky |
| 96° C. | Less tacky | Less tacky |

Example 4

A coating composition was prepared in the following manner. The pre-polymer of example 1 (3.74 g) was mixed with NMP (6.23 g). Then, the catalyst dibutyltin dichloride (DBTDC, 0.599 g), photochromic dye 7-120 (0.018 g) and photochromic dye 7-176 (0.011 g) were added and mixed until dissolved. A small amount of heat (heat gun) was required to dissolve dyes into the solution. A solution comprising the polyester triol CAPA® 3050 (1.32 g, molar ratio of NCO/OH=1) and NMP (0.66 g) was added to the coating composition and sonication was used to remove bubbles.

The prepared coating composition was spin coated (500 rpm for 10 s increased to 1000 rpms for 30 s) onto a clean CR-39® piano lens. The lens was placed in the LESCO EZ-IR curing system set at 700° C. for 45 seconds.

It was observed that the prepared polyurethane coating was still tacky. The lens was subjected to sunlight to verify photochromic change. The coating did change color and reversed when removed from sunlight.

Example 5

Two coating compositions were prepared in the following manner. The pre-polymer of example 1 (3.68 g) was mixed with NMP (6.29 g). Then, the catalyst dibutyltin dichloride (DBTDC, 0.0.519 g for example 5.1, 1.036 g for example 5.2), photochromic dye 7-120 (0.019 g) and photochromic dye 7-176 (0.011 g) were added and mixed until dissolved. A small amount of heat (heat gun) was required to dissolve dyes into the solution. A solution comprising the polyester triol CAPA® 3050 (1.10 g, molar ratio of NCO/OH=1.18) and NMP (0.55 g) was added to the coating composition and sonication was used to remove bubbles.

The prepared coating compositions were each spin coated (500 rpm for 10 s increased to 1000 rpms for 30 s) onto clean CR-39® piano lenses. The lenses were placed in the LESCO EZ-IR curing system set at 725° C. for 45 seconds.

It was observed that the polyurethane coating of example 5.1 was very tacky and that the polyurethane coating of example 5.2 was a little tacky. The lenses were subjected to sunlight to verify photochromic change. The coating did change color and reversed when removed from sunlight.

Example 6

Preparation of an Impact Resistant, Abrasion and/or Scratch Resistant Photochromic Ophthalmic Lens According to the Invention A coating composition was prepared in the following manner. The pre-polymer of example 1 (4.992 g) was mixed thoroughly with THF (5.008 g) in a glass vial. Sonication for 15 minutes (without heating) was used to remove bubbles.

In a second glass vial were added THF (1.50 g), photochromic dye Photosol 7-219 (0.1 g) and the catalyst dibutyltin dichloride (DBTDC, 0.5085 g). The mixture was mixed thoroughly to ensure dissolution of the dye and catalyst. Then, the polycaprolactone triol CAPA® 3050 (1.566 g, molar ratio of NCO/OH=1.13) and Silwet 7620 (0.06 g) were added to the mixture which was stirred thoroughly. Sonication for 15 minutes (without heating) was used to remove bubbles. Some of the THF that was lost during degassing may optionally be replaced.

The content of the second glass vial was added to the first glass vial and the mixture was stirred thoroughly. Sonication for 5 minutes (without heating) was used to remove bubbles.

The prepared coating composition was spin coated (750 rpm for 10 s increased to 1200 rpms for 1 s) onto clean CR-39® lenses (FSV −2.00 sphere or FSV piano lenses). The lenses were placed in a convection oven set at 80° C., 90° C., or 100° C. for 5 minutes.

After the deposited impact resistant photochromic polyurethane coating was cured and cooled, it was spin coated (750 rpm for 10 seconds) with a protective coating composition comprising a major amount of diethylene glycol diacrylate (SR-230 from Sartomer), and minor amounts of dipentaerythritol pentaacrylate (SR-399 from Sartomer), an acrylated polyol (PETIA from UCB Radcure Inc.), the photoinitiator Irgacure® 500 (1:1 w/w mixture of 1-hydroxycyclohexyl-phenylketone and benzophenone provided by Ciba Specialty Chemicals, and a surfactant. The deposited protective coating composition was UV-cured using Fusion belt system with H bulb and belt speed set at the maximum of 7.

The deposited protective coating was then spin coated (750 rpm for 10 seconds) with the sol-gel abrasion- and/or scratch-resistant coating composition disclosed in FR 2702486, comprising a hydrolyzate of γ-glycidoxypropyl-trimethoxysilane and dimethyl-diethoxysilane, colloidal silica and a catalytic amount of aluminum acetylacetonate.

The lenses were cured in a convection oven for 3 hours at 100° C. This step allowed curing of the abrasion- and/or scratch-resistant coating composition, but also completed the curing of the impact resistant photochromic coating.

Photochromic properties of the prepared lenses were then checked. FIG. 1 represents the transmission factor (%) in the visible spectrum as a function of time of the above lens (photochromic film cured for 5 min at 80° C.), which was initially (t=0) taken into the sunlight and removed from sunlight at t=15 minutes. The coating did change color and reversed when removed from sunlight. The half time for fading was ~39 seconds.

Lenses were then marked and packaged in envelopes.

While the present methods may be adaptable to various modifications and alternative forms, specific embodiments have been shown by way of example. However, it should be understood that the present methods and compositions are not intended to be limited to the particular forms disclosed. Rather, they are to cover all modifications, equivalents, and alternatives falling within the scope of the claims.

Moreover, the different aspects of the disclosed methods may be utilized in various combinations and/or independently. Thus the present methods and compositions are not limited to only those combinations disclosed, but rather may include other combinations. Those of skill in the art will understand that numerous other modifications may be made to the disclosed methods and compositions, and that such similar substitutes and modifications are within the scope of the claims.

The invention claimed is:

1. A process for obtaining an impact resistant, abrasion and/or scratch resistant photochromic article comprising a substrate having two main faces comprising:
   preparing a curable coating composition comprising at least one unblocked polyisocyanate terminated polyurethane pre-polymer, at least one polyol, and at least one photochromic agent; wherein the polyurethane pre-polymer has a number average molecular weight of from 1,000 to 6,000 g/mol
   depositing the prepared curable coating composition onto at least part of a main face of the substrate;
   curing said curable coating composition for 10 minutes or less, at a temperature lower than or equal to 100° C. so as to form an impact resistant photochromic coating; and
   forming an abrasion and/or scratch resistant coating on the impact resistant photochromic coating or forming a protective coating on the impact resistant photochromic coating and then forming an abrasion and/or scratch resistant coating on said protective coating.

2. The process of claim 1, wherein the substrate is made of mineral glass or organic glass.

3. The process of claim 2, wherein the substrate is an organic glass comprising at least one thermoplastic material or thermosetting (cross-linked) material.

4. The process of claim 1, wherein the curable coating composition is cured for 5 minutes or less.

5. The process of claim 1, wherein the curable coating composition is cured at a temperature lower than or equal to 95° C.

6. The process of claim 1, wherein the impact resistant photochromic coating presents a tacky surface at 20-25° C. after curing.

7. The process of claim 1, wherein the abrasion and/or scratch resistant coating is made from a thermally curable composition.

8. The process of claim 7, wherein the abrasion and/or scratch resistant coating is cured at a temperature lower than or equal to 100° C.

9. The process of claim 1, wherein the abrasion and/or scratch resistant coating is made from a composition comprising a hydrolyzate of an epoxytrialkoxysilane and dialkyldialkoxysilane, colloidal mineral fillers and a catalytic amount of an aluminum-based curing catalyst.

10. The process of claim 1, wherein a protective coating is interleaved between said impact resistant photochromic coating and said abrasion and/or scratch resistant coating.

11. The process of claim 10, wherein the protective coating is made from a composition comprising at least one multifunctional (meth)acrylate.

12. The process of claim 1, wherein an anti-reflection coating is applied on the abrasion- and/or scratch-resistant coating.

13. The process of claim 1, wherein the curable coating composition further comprises at least one solvent.

14. The process of claim 13, wherein the solvent is N-methylpyrrolidone, tetrahydrofuran, acetonitrile, dioxane, or a mixture thereof.

15. The process of claim 1, wherein the polyol is a polyol with a number average molecular weight less than 400, a polyester polyol, a polyether polyol, a polyol containing an amide group, a polyacrylic polyol, an epoxypolyol, a polyvinyl polyol, or a urethane polyol.

16. The process of claim 15, wherein the polyol is a polyester polyol.

17. The process of claim 16, wherein the polyol has a number average molecular weight ranging from 400 to 10,000 g/mol.

18. The process of claim 17, wherein the polyol has a number average molecular weight ranging from 500 to 6,000 g/mol.

19. The process of claim 16, wherein the polyester polyol is prepared by the reaction of a polyol and a lactone.

20. The process of claim 19, wherein the lactone is ε-caprolactone, propiolactone or butyrolactone.

21. The process of claim 19, wherein the polyol is neopentyl glycol, trimethylol propane, diethylene glycol, or glycerol.

22. The process of claim 1, wherein the polyol has at least three hydroxyl groups.

23. The process of claim 22, wherein the polyol is a polycaprolactone triol.

24. The process of claim 1, wherein the polyurethane pre-polymer is obtained by the reaction of an excess of at least one polyisocyanate with at least one polyol.

25. The process of claim 24, wherein the polyisocyanate and polyol for obtaining the polyurethane pre-polymer are used in an amount such that the molar ratio of NCO to OH groups is from 2:1 to 8:1.

26. The process of claim 24, wherein the polyisocyanate is a diisocyanate.

27. The process of claim 24, wherein the polyisocyanate is an aliphatic diisocyanate further defined as hexamethylene-1,6-diisocyanate, isophorone diisocyanate, ethylene diisocyanate, dodecane-1,12-diisocyanate, cyclohexane-1,3-diisocyanate, or bis-(4-isocyanato-cyclohexyl)-methane.

28. The process of claim 1, wherein the polyol and the unblocked polyisocyanate terminated polyurethane pre-polymer are used in an amount such that the molar ratio of NCO to OH groups is from 0.8 to 1.2.

29. The process of claim 1, wherein the photochromic agent is an organic compound further defined as an oxazine derivative, a chromene, photochromic derivative of chromene, fulgide, fulgimide, or organometallic derivative of dithizonate.

30. The process of claim 1, wherein the photochromic agent is a spirooxazine, further defined as a spiro[indolino] benzoxazine, a spiro[indolino] naphtoxazine, or a spiro[indolino] pyridobenzoxazine.

31. The process of claim 1, wherein the curable coating composition further comprises at least one catalyst further defined as a tin catalyst or amine catalyst.

* * * * *

UNITED STATES PATENT AND TRADEMARK OFFICE
CERTIFICATE OF CORRECTION

PATENT NO. : 7,662,433 B2  Page 1 of 1
APPLICATION NO. : 11/532272
DATED : February 16, 2010
INVENTOR(S) : Ford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Thirtieth Day of November, 2010

David J. Kappos
*Director of the United States Patent and Trademark Office*